United States Patent [19]

Faulkner et al.

[11] Patent Number: 5,245,459
[45] Date of Patent: Sep. 14, 1993

[54] OPTICAL COMMUNICATIONS SYSTEMS

[75] Inventors: David W. Faulkner, Ipswich; Andrew R. J. Cook, Tendring, both of England

[73] Assignee: British Telecommunications public limited company, London, England

[21] Appl. No.: 773,639
[22] PCT Filed: May 25, 1990
[86] PCT No.: PCT/GB90/00826
  § 371 Date: Nov. 18, 1991
  § 102(e) Date: Nov. 18, 1991
[87] PCT Pub. No.: WO90/14733
  PCT Pub. Date: Nov. 29, 1990

[30] Foreign Application Priority Data
  May 25, 1989 [GB] United Kingdom ............... 8912014

[51] Int. Cl.⁵ .............................................. H04J 14/02
[52] U.S. Cl. .................................... 359/125; 359/132; 359/191
[58] Field of Search ............... 359/118, 125, 132, 133, 359/114, 124, 157, 191; 358/86; 455/5.1

[56] References Cited
  U.S. PATENT DOCUMENTS
  4,726,010  2/1988  Ali et al. .............................. 359/125

FOREIGN PATENT DOCUMENTS
  0269001  6/1988  European Pat. Off. ............. 359/125

OTHER PUBLICATIONS
  ECOC 87, Technical Digest, vol. III, 1987, C. Baack et al: "Coherent multicarrier techniques in future broadband communication networks", pp. 79-87.
  Patent Abstracts of Japan, vol. 9, No. 75 (E-306) (1798), 4 Apr. 1985, & JP, A, 59208952 (Fujitsu K.K.) 27 Nov. 1984.
  ECOC 87, Technical Digest, vol. II, 1987, R. Olshansky et al: "RF multiplexing techniques applied to video distribution in local networks", pp. 122-125.
  IEEE Journal on Selected Areas in Communications, vol. 6, No. 7, Aug. 1988, IEEE, (New York, U.S.): R. Kishimoto et al: "Fiber-optic digital video distribution system for high-definition television signals using laser diode optical switch", pp. 1079-1086.

Primary Examiner—Edward L. Coles, Sr.
Assistant Examiner—Kinfe-Michael Negash
Attorney, Agent, or Firm—Nixon & Vanderhye

[57] ABSTRACT

A system for distributing interactive HDTV signals includes a head-end station and a number of customer stations. The head-end station includes at least one optical source. A bidirectional transmissive broadband passive branched optical network distributes HDTV signals from the head-end station to the customer stations. Each customer station includes an optical coupler arranged to couple the subscriber station to a respective arm of the optical network a coherent receiver including a local oscillator laser and a transmitter arranged to modulate light from the local oscillator laser with return data for transmission via the coupler onto the network. The head-end station also includes a broadband optical receiver arranged to receive and demodulate the return data received via the optical network.

17 Claims, 3 Drawing Sheets

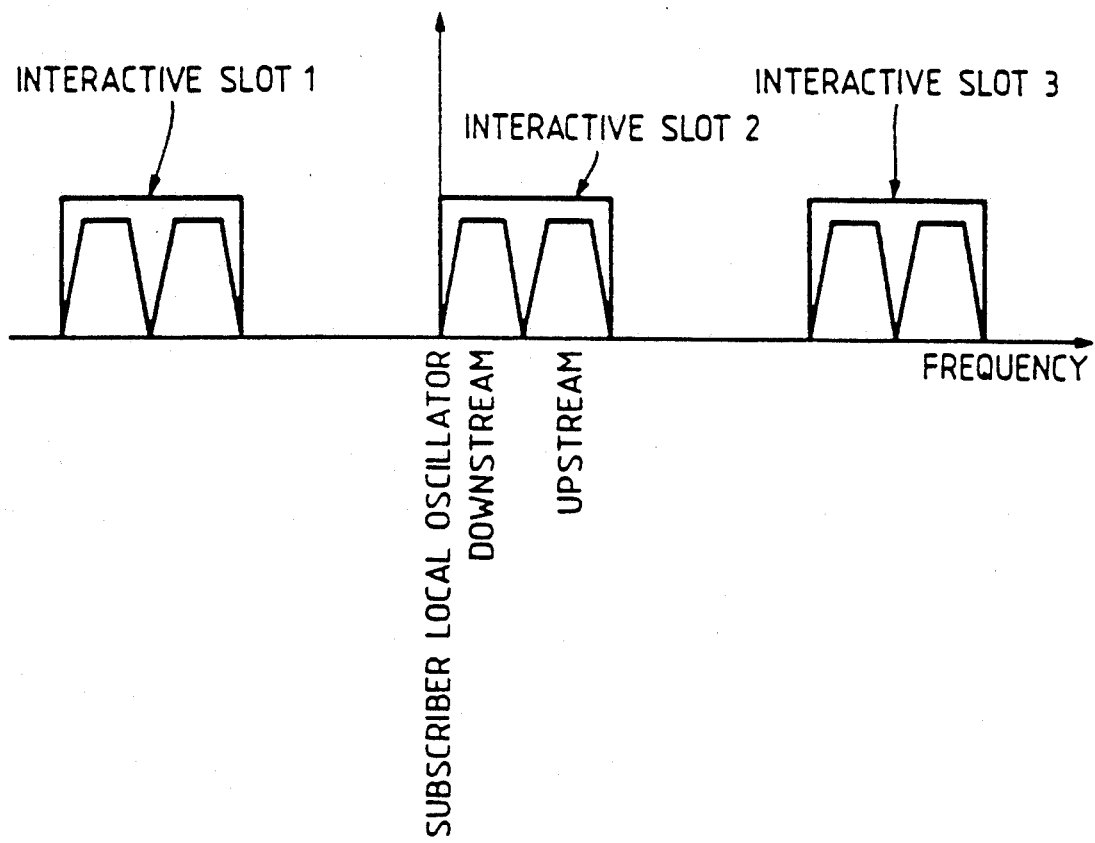

OPTICAL COMMUNICATIONS SYSTEMS

The present invention relates to optical communications systems, and particularly but not exclusively, to systems employing a broadband passive optical network (BPON) for carrying interactive high definition television (HDTV) services.

Advancing technical standards for television signals and consumer-demand for an increasing range of associated services has led to a need for systems capable of carrying interactive HDTV. For the distribution of conventional PAL encoded television signals the use of a BPON having a branched configuration has been proposed. However, it is found that because of the increased bandwidth needed for HDTV signals conventional networks are unable to carry more than a few channels within the limits imposed by the available power budget. This problem is further exacerbated by the need in an interactive HDTV system to provide channels for return data transmission from the customer stations to the head-end station.

There is known from, ECOC 87, Technical Digest, Vol. III, pages 79-87; C. Baack et al.: "Coherent multicarrier techniques in future broadband communication networks" a system for providing ISDN services, broadband communication service, video telephone and broadband distribution services such as HDTV to customers via respective single fibres. The head station employs a separate laser for each wavelength to be transmitted onto the fibre network and the customer's station employs heterodyne detection. Upstream transmission from customer's station is obtained by feeding the output of a separate opto-electronic converter into a fibre coupler in the customer's station and, for each customer, feeding an output from a respective coupler at the head station to a respective opto-electronic converter.

In Japanese patent application No. 58-81812 (publication No. 59-208952) in the name of Fujitsu K. K. each of the two stations linked by go and return fibres has a local oscillator laser employed in a coherent heterodyne receiver. Light from the local oscillator laser in one station is modulated by local data for transmission to the other station. In such a point to point arrangement there is no need for a stable laser frequency because the feedback control acts to stabilise the frequency difference between the transmitter laser and local oscillator laser in a station.

The Fujitsu system is limited to one station receiving only $f_2$ from a single remote station, from which it produces $f_1-f_2$ and thereby controls the transmitter to maintain $f_1-f_2$ constant. If a station were to be coupled to more than one remote station then the feedback control would have present the signals $f_1-f_2$, $f_1-f_3$, etc and would not be able to function.

There is disclosed in ECOC 87, Technical Digest, Vol II, pages 122-125, R. Olshansky: "RF multiplexing techniques applied to video distribution in local networks" a system employing sub-carrier multiplexing in a head station for the distribution of video signals over an optical network.

In the Olshansky system a number of voltage controlled oscillators operating at microwave frequencies are directly frequency modulated. The outputs from the oscillators are combined in a combiner whose output is used to intensity modulate the transmitter laser, and Olshansky refers to wide bandwidth (15 GHz) devices as detectors in the remote terminals. With the Olshansky head-end arrangement, it would not be possible to employ a coherent heterodyne detection system in the customer stations because of a characteristic of the transmission spectrum of such a head-end known by engineers as "chirp".

This problem is avoided in the system of the present invention by the use of the external modulator which receives the light from the head-end laser and modulates it with the transmission signal.

According to the present invention an optical communications system comprises:

a head-end station including an optical source, a bi-directional transmissive broadband passive branched optical network arranged to distribute signals from the head-end station to customer stations and to carry return data transmissions from the customer stations to the head-end station, each customer station being coupled to a respective arm of the optical network, and including a coherent receiver having a local oscillator laser: characterised in that the head-end station further includes a modulator associated with the optical source and arranged to receive light from its associated optical source and to modulate the light with a signal for distribution to the customer stations, and a broadband optical receiver arranged to receive and demodulate return data received via the optical network from the customer stations, and in that each customer station further includes transmission means arranged to receive light from its associated local oscillator laser and to modulate the light with the return data for transmission onto the network.

The present invention provides a system which has been found to offer significant advantages as a carrier for e.g. interactive HDTV. The use of synchronous detection at each customer station increases the effective sensitivity of the system and so allows more channels to be carried within a given power budget. At the same time the local oscillator laser in each receiver provides a source for upstream data transmission. Since there is then effectively one source for each of the return data channels it is possible to use a broadband receiver at the head-end station to receive the return data, despite its relative insensitivity. The use of broadband detection in the head-end station receiver simplifies the requirements for the transmission circuitry in each customer station.

Preferably the bi-directional network is in the form of a single branched optical fibre arrangement, each customer station has its coherent receiver coupled to its respective arm via an optical coupler and the output from its transmission means is fed onto the network via the optical coupler.

Preferably the optical source has a frequency $f_0$ and its associated modulator is arranged to modulate the light with a sub-carrier multiplex of n channels where n is an integer greater than 2, the n channels having frequencies $f_1, f_2 \ldots f_0$ separated in frequency-space from each other and from $f_0$, and the transmission means of each customer station are arranged to transmit the return data at a frequency $f_r$, where $f_r$ is a frequently different from the frequencies $f_1, f_2 \ldots f_n$ of the downstream channels.

Preferably the head end station includes a further optical source having a frequency $f_0$ and an associated modulator, the n channels of the corresponding sub-carrier multiplex having frequencies $f_1, f_2, \ldots f_n$ separated in frequency-space from each other and $f_0$ and from $f_0$, $f_1, f_2 \ldots f_n$ and the frequency $f_r$ of the return transmission is different from the frequencies $f_1, f_2 \ldots f_n$ of the downstream channels.

Preferably each customer station is arranged to select a frequency $f_r$ spaced from but adjacent to the selected one of the downstream channels selected for reception by that customer station.

Preferably n is greater than equal to 16.

Preferably the serve includes at least 16 customer stations and the or each optical source of the head-end station has an optical power output of substantially 1 mW.

A system in accordance with the present invention will now be described in detail with respect to the accompanying drawings in which:

FIG. 5 is a graph showing the spectral positions of interactive slots.

Figure 1:
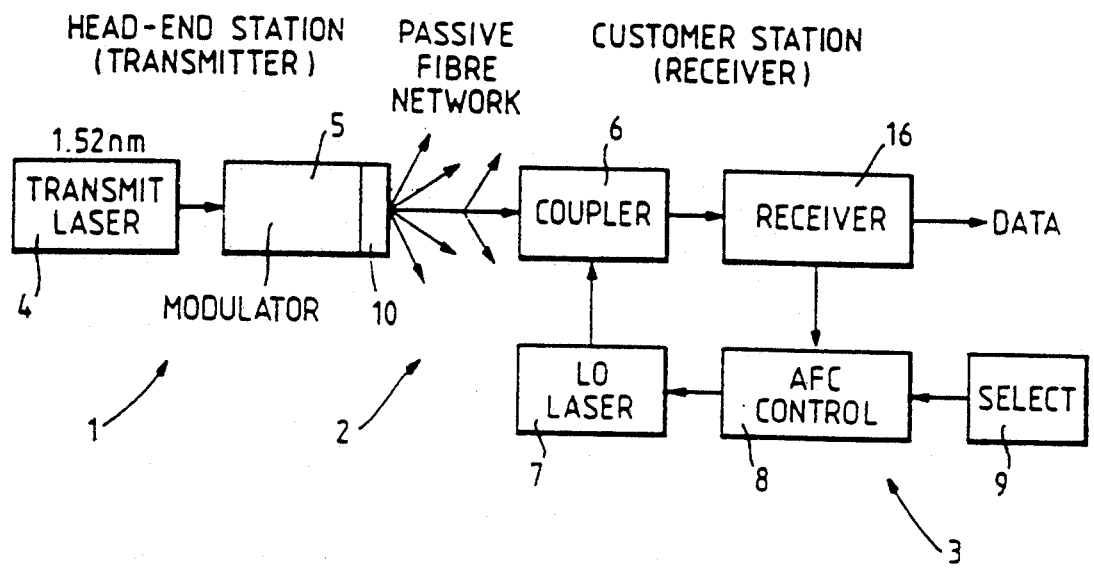
FIG. 1 is a block diagram.

A system for distributing HDTV signals comprises a head-end station 1 connected via a passive branched optical fibre network 2 to a number of customer stations 3. In FIG. 1, for clarity, only a single customer station is shown but in practice 16 or more stations will be connected to a single head-end station. The head-end station 1 includes a single optical source, which in the present example is provided by a distributed feedback laser 4 having an operating wavelength of 1.52 nm and an output power of 1 mW. The output from the laser 4 is fed to an external $LiNBO_3$ modulator 5 where it is intensity-modulated by a sub-carrier multiplex signal as described below. Alternatively a modulator formed from Potassium titanyl phosphate (KTP) may be used.

Figure 3:
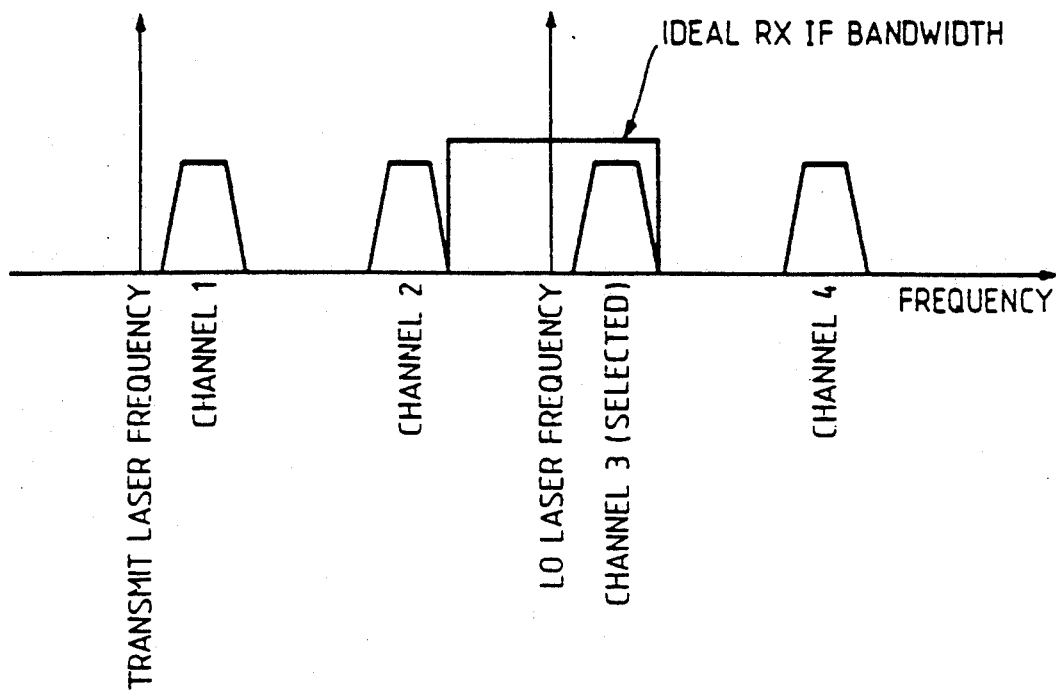
FIG. 3 is a graph showing the spectral positions of frequency components of an HDTV signal.

The amplitude of the optical output from the modulator 5 varies in accordance with the applied modulating signal. Phase or frequency modulation may alternatively be used. In the present example the modulating signal is a sub-carrier multiplex of 16 HDTV channels occupying a total bandwidth of approximately 10 GHz. Although the channels may be analogue encoded in the preferred example they are digitally encoded with a data rate of the order of 500 Mb/s, in which case the signals are encoded on the carrier from the laser using frequency shift keying. FIG. 3 shows part of the spectrum of the output from the modulator.

The signal from the modulator 5 is coupled to the optical fibre network 2 via a coupler 10. The network 2 comprises a broadband passive branched optical network using a configuration with a single fibre extending to each customer station and passive splitters or couplers at each node of the network.

Figure 2:
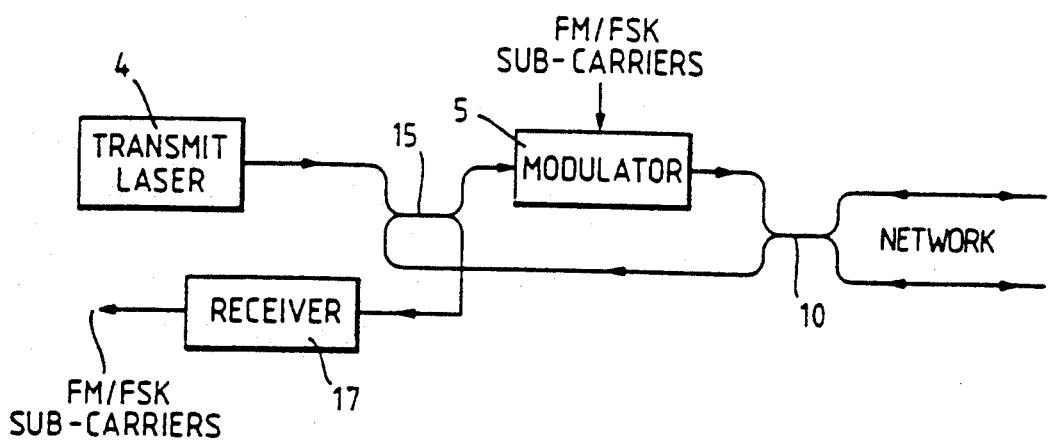
FIG. 2 is a schematic showing the head-end station in greater detail.

In FIG. 2 the coupler 10 is shown as having two output ports connected to two fibres, and may be considered as the first stage of splitting in the branched network. Depending on the coupler construction it may have any convenient number of output ports.

Each customer station 3 includes a receiver employing a coherent heterodyne detection system. The respective arm of the fibre network 2 is fed to a coupler 6 at the input of each receiver. The coupler 6 also receives an optical input from a local oscillator laser 7 which is mixed with the input signal from the network. The frequency of the local oscillator laser 7 is controlled by an AFC control loop 8 which is in turn controlled by an input from a channel select circuit 9. The AFC control 8 locks the local oscillator laser 7 at a frequency offset from the 1.52 nm carrier frequency by an appropriate amount to select a desired channel. Then when the signal from the local oscillator laser 7 is mixed with the input to the coupler 6 a low-frequency heterodyne output is produced. This output is fed to a low-frequency optical receiver 16 having a bandwidth of approximately 80 MHz for an analogue system or 350 MHz for a digital system. Such an ASK heterodyne system has a theoretical maximum sensitivity of $-60$ dBm and in practice a sensitivity as high as $-50$ dBm can be achieved.

The data output from the receiver may be used to provide feedback to the channel select mechanism, the initial tuning being achieved by looking for an encoded channel identification on the received signals and the lock subsequently being maintained by the AFC loop. The tuning is controlled by varying the drive current to the local oscillator and only a small shift is required to select a given channel.

In the preferred embodiment digital modulation is used and then it is straightforward to provide polarisation independence in the demodulation at the receiver. If however it is required to carry analogue modulated signals on the network then polarisation scrambling is used at the receiver to provide the required polarisation independence. The techniques of polarisation scrambling in coherent detection are described in detail in the paper by T. G. Hodgkinson et al. published at pages 513-514 of Electronics Letters, Vol 23, No. 10, May 7, 1987.

The use of the network for interactive services requires the transmission of data in the return direction that is from each customer station upstream to the head-end station. The upstream data transmissions from individual stations will typically have a narrower bandwidth than the conventional HDTV signals and may, for example comprise PAL encoded TV signals. The downstream data may comprise an HDTV signal of the type described above as when, for example, the customer selects video programme material from a library held at the head-end station. In other applications when, for example, both upstream and downstream transmissions comprise digitised text, then both the upstream and downstream channels are of narrower bandwidth than the HDTV signals otherwise carried on the network.

Figure 4:
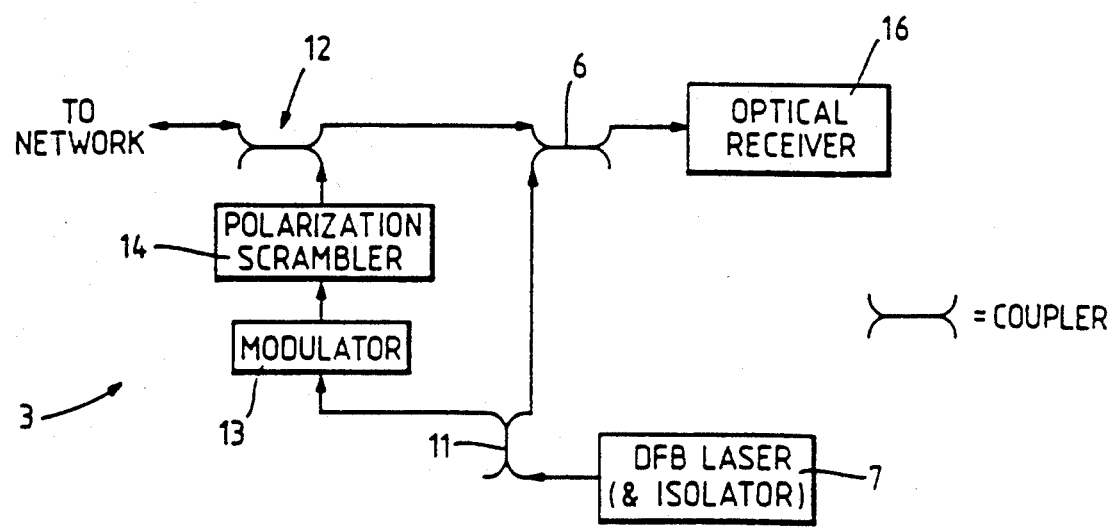
FIG. 4 is a schematic showing a customer station.

As shown in FIG. 4 the local oscillator laser 7 provides the optical source for the upstream data transmissions from each customer station. The output of the laser 7 is taken to a coupler 11. One output of the coupler 11 is fed via coupler 6 into the primary detection loop. The other output of the coupler 11 feeds a modulator 13. The modulator 13 modulates the optical signal from the laser 7 with the data for upstream transmission using, for example, amplitude shift keying (ASK). The output from the modulator 13 is fed via a polarisation scrambler 14 to an input/output coupler 12 and from there onto the network.

When a customer station enters interactive mode a frequency slot is allocated to the station from a selection of channels not used for broadcast so enabling wavelength reuse. Within the slot, the return channel is positioned adjacent to, but spaced from, the downstream channel, as shown in FIG. 5.

At the head-end a wideband optical receiver 17 receives the entire multiplex of upstream customer traffic.

If the split ratio is high then a coherent detector is used at the head-end, otherwise direct detection is employed. As shown in FIG. 2, a portion of the output from the transmit laser 4 is coupled via a coupler 15 having a coupling ratio of typically 10:1 into the path of the incoming optical signal to provide the reference signal for a conventional coherent detection system.

Although the above described embodiment is concerned with the distribution of HDTV signals and the return transmission of PAL encoded TV signals, it will be appreciated that the technique of the present invention can be used with any other suitable signals, so that the number of channels available in the SCM will be inversely proportional to the bandwidth of the channels.

Whereas the optical network 2 is in the form of a single branched optical fibre, in an alternative arrangement it can be in the form of separate go and return branched optical fibres, in which case the output from the polarization scrambler 14 is fed directly to the respective arm of the return optical fibre, and the respective arm of the go optical fibre is connected to the coupler 6.

We claim:

1. An optical communications system comprising:
   a head-end station including an optical source, a plurality of customer stations;
   a bi-directional transmissive broadband passive branched optical network coupled between the head-end station and the customer stations to distribute signals from the head-end station to the customer stations and to carry return data transmissions from the customer stations to the head-end station,
   each customer station being coupled to a respective arm of the optical network, and including a coherent optical receiver having a local oscillator laser;
   the head-end station having modulator associated with the optical source and coupled to receive light from its associated optical source and to modulate the light with a signal for distribution to the customer stations, and a broadband optical receiver coupled to receive and demodulate return data received via the optical network from the customer stations, and
   each customer station including transmission means coupled to receive light from its associated local oscillator laser and to modulate the light with the return data for transmission onto the network.

2. A system according to claim 1, in which the bi-directional network is in the form of a single branched optical fibre arrangement, each customer station having its coherent receiver coupled to its respective arm via an optical coupler and the output from its transmission means being fed onto the network via the optical coupler.

3. An optical communications system comprising:
   a head-end station including an optical source,
   a plurality of customer stations,
   a bidirectional transmissive broadband passive branched optical network coupled between the head-end station and the customer stations to distribute signals from the head-end station to the customer stations and to carry return data transmissions from the customer stations to the head-end station,
   each customer station being coupled to a respective arm of the optical network and including a coherent optical receiver having a local oscillator laser;
   the head-end station having a modulator associated with the optical source and coupled to receive light from its associated optical source and to modulate the light with a signal for distribution to the customer stations, and a broadband optical receiver coupled to receive and demodulate return data received via the optical network from the customer stations, and
   each customer station including transmission means arranged to receive light from its associated local oscillator laser and to modulate the light with the return data for transmission onto the network,
   the optical source having a frequency f and its associated modulator being coupled to modulate the light with a sub-carrier multiplex of n channels where n is an integer greater than 2, the n channels having frequencies $f_1, f_2 \ldots f_n$ separated in frequency-space from each other and from $f_0$, and the transmission means of each customer station being arranged to transmit the return data at a frequency $f_r$, where $f_r$ is a frequency different from the frequencies $f_1, f_2 \ldots f_n$ of the downstream channels.

4. A system according to claim 3 in which the head-end station includes a further optical source having a frequency $f'_0$ and an associated modulator, the n channels of the corresponding sub-carrier multiplex having frequencies $f'_1, f'_2 \ldots f'_n$ separated in frequency-space from each other and $f'_0$ and from $f_0, f_1, f_2 \ldots f_n$ and the frequency $f_r$ of the return transmission being different from the frequencies $f'_1, f'_2 \ldots f'_n$ of the downstream channels.

5. A system according to claim 4, in which, in use, each customer station selects a frequency $f_r$ spaced from but adjacent to the downstream channel selected for reception by that customer station.

6. A system according to claim 4, in which n is greater than or equal to 16.

7. A system according to claim 4 in which the system includes at least 16 customer stations and each optical source of the head-end station has an optical power output of substantially 1 mW.

8. A system according to claim 3, in which, in use, each customer station selects a frequency $f_r$ spaced from but adjacent to the downstream channel selected for reception by that customer station.

9. A system according to claim 8 in which the system includes at least 16 customer stations and the optical source of the head-end station has an optical power output of substantially 1 mW.

10. A system according to claim 3, in which n is greater than or equal to 16.

11. A system according to claim 10 in which the system includes at least 16 customer stations and the optical source of the head-end station has an optical power output of substantially 1 mW.

12. A system according to claim 3, in which the system includes at least 16 customer stations and the optical source of the head-end station has an optical power output of substantially 1 mW.

13. An optical communications system comprising:
    a head-end station including an optical source,
    a plurality of customer stations,
    a bidirectional transmissive broadband passive branched optical network coupled between the head-end station and the customer stations to distribute signals from the head-end station to the customer stations and to carry return data transmissions from the customer stations to the head-end station, each customer station being coupled to a respective arm of the optical network and including a coherent optical receiver having a local oscillator laser;

the head-end station having a modulator associated with the optical source and coupled to receive light from its associated optical source and to modulate the light with a signal for distribution to the customer stations, and a broadband optical receiver coupled to receive and demodulate return data received via the optical network from the customer stations, and each customer station including transmission means arranged to receive light from its associated local oscillator laser and to modulate the light with the return data for transmission onto the network, the system including at least 16 customer stations and the optical source of the head-end station has an optical power output of substantially 1 mW.

14. An optical communication system comprising:

a head-end station which provides plural frequency-multiplexed optical signal channels on an optical transmit laser carrier frequency;

a plurality of customer stations coupled to said head-end station by at least one passive optical fibre network;

said customer stations each including a coherent optical receiver with a frequency-controlled local laser used for heterodyne selection of one of said frequency-multiplexed optical signal channels for reception thereat;

said local laser also being coupled to a local customer station optical modulator which generates return optical signals for transmission back to said head-end station via said fibre network on a frequency-multiplexed optical signal return channel determined by the frequency of said local oscillator.

15. An optical communications system as in claim 14 wherein said head-end station includes an optical signal channel receiver which is coupled to receive said return optical signals and heterodyne them with the transmit laser carrier frequency to provide return channel outputs.

16. A method of optical communication comprising:

providing plural frequency-multiplexed optical signal channels on an optical transmit laser carrier frequency;

coupling said optical signal channels, via an optical fibre network, to plural customer stations, each station including a coherent optical receiver with a frequency-controlled local laser used for heterodyne selection of one of said frequency-multiplexed optical signal channels for reception thereat;

coupling said local laser also to a local customer station optical modulator which generates return optical signal for transmission back through said fibre network on a frequency-multiplexed optical signal return channel determined by the frequency of said local oscillator.

17. A method of optical communication as in claim 16 wherein an optical signal channel receiver is coupled to receive said return optical signals and heterodyne them with the transmit laser carrier frequency to provide return channel outputs.

* * * * *